Figure 1:
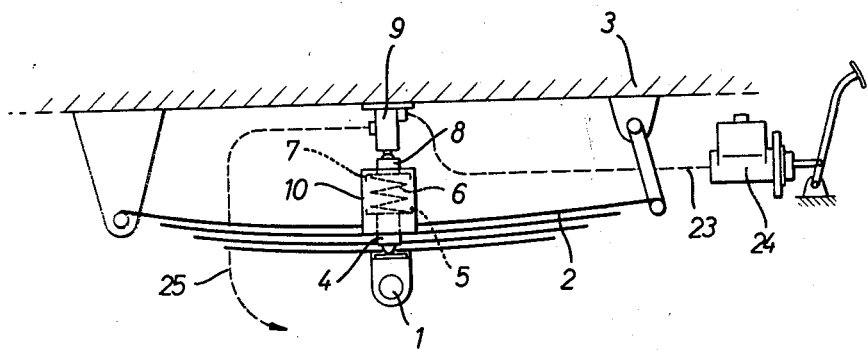

Sept. 22, 1964    H. G. W. DORNER    3,149,886
LOAD-CONTROLLED BRAKE SYSTEM
Filed April 9, 1963    3 Sheets-Sheet 1

Inventor
Harro G. W. Dorner
By Stevens, Davis, Miller & Mosher
Attorneys

Sept. 22, 1964    H. G. W. DORNER    3,149,886
LOAD-CONTROLLED BRAKE SYSTEM
Filed April 9, 1963    3 Sheets-Sheet 3

Inventor
Harro G. W. Dorner
By Stevens, Davis, Miller & Mosher
Attorneys

United States Patent Office 3,149,886
Patented Sept. 22, 1964

3,149,886
LOAD-CONTROLLED BRAKE SYSTEM
Harro Georg Werner Dorner, Ebern Unterfranken, Germany, assignor to Kugelfischer Georg Schäfer & Co., Schweinfurt, Germany
Filed Apr. 9, 1963, Ser. No. 271,735
Claims priority, application Germany Apr. 16, 1962
2 Claims. (Cl. 303—22)

This invention relates to a device adapted to control the braking effort applied to the wheels of an axle in an hydraulically brakable vehicle as a function of the axle load, a fluid pressure developed in a master brake cylinder being transmitted to the wheel brake cylinders via a pressure line. There has already been proposed a device of this general type in which both the forward and the rearward braking device of the vehicle is provided with a pivotally mounted two-armed lever, an hydraulic governor applying to one arm of said two-armed lever a variable pressure corresponding to the required braking effort, and there being provided an hydraulic force transmitting device between the other arm of said lever and the associated brake. This known system includes suitable members which are controlled by variations in the deflection of the suspension springs of the vehicle and are thus adapted to vary the position of the fulcrum of said two-armed lever, thus causing a change in the ratio between the lengths of the lever arms. This known device requires the use of a considerable number of small parts, this fact rendering the said device expensive and reducing its reliability in operation.

It is a main object of this invention to provide a device of the aforesaid type requiring a minimum number of parts and designed to be largely independent of any external factors. This object is achieved, according to the invention, by the provision, in the pressure line, of a shut-off valve which is controlled by a piston, this piston being influenced by the fluid pressure prevailing in the wheel brake cylinders as well as by the axle load, the arrangement being such that a reduction in axle load causes the said shut-off valve to be closed, whereby any increase in the fluid pressure prevailing in the wheel brake cylinders is prevented, and that an increase in axle load cause the said piston to open the shut-off valve, thus permitting the wheel brake cylinders to be subjected to a fluid pressure corresponding to the increased axle load. In a specific embodiment of the invention, there is provided an elastic member between the control piston and the axle of the vehicle. According to another feature of the invention, a safety device is provided which will come into action upon failure of the elastic member or of the linkage connected thereto, this safety device comprising a pressure line bypassing the shut-off valve, connecting the master brake cylinder direct to the wheel brake cylinders, and being closed by a spring-loaded closure member, the arrangement being such that upon the pressure prevailing in the master brake cylinder exceeding a predetermined minimum pressure the dependence of the fluid pressure prevailing in the wheel brake cylinders on the axle load is eliminated.

Figure 2:
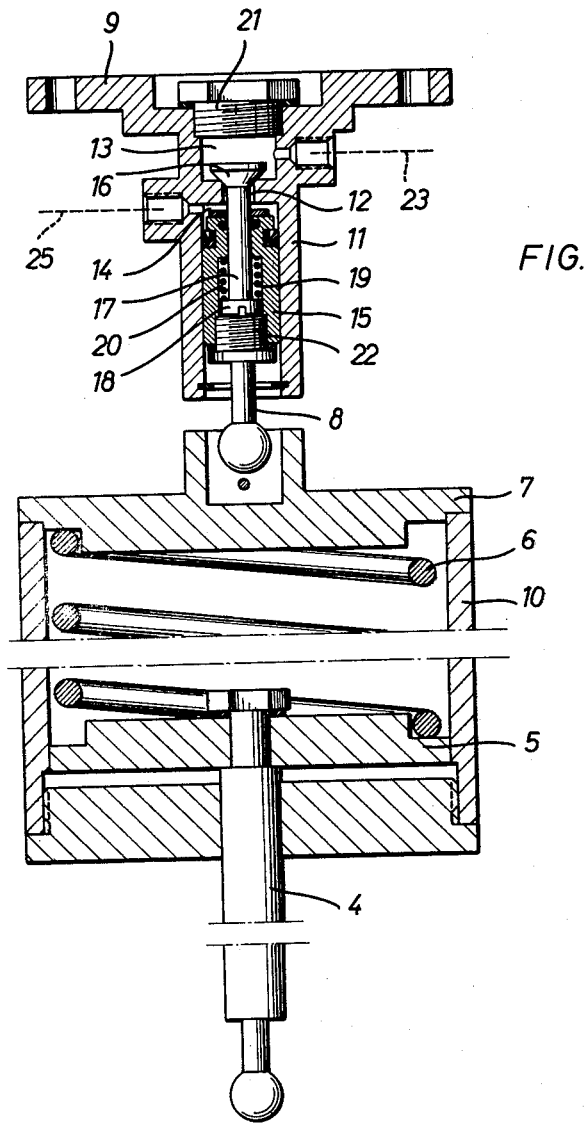
Figure 3:
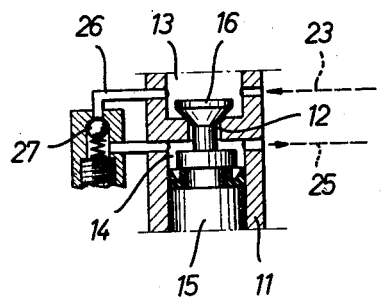
Figure 4:
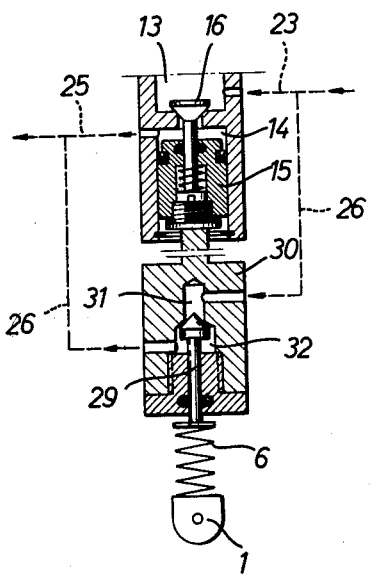

Other objects and features of the invention will become apparent as the description proceeds, especially when taken in conjunction with the accompanying drawings, illustrating one embodiment of the system of the invention and several embodiments of the safety device of the invention, wherein:

FIG. 1 is a diagrammatic side-elevational view of the device installed on a vehicle, FIG. 2 is an enlarged longitudinal cross-sectional view of the device, FIG. 3 is longitudinal cross-sectional view of one embodiment of the safety device associated with the device of FIGS. 1 and 2, and, FIG. 4 is a longitudinal cross-sectional view of another embodiment of the safety device.

Referring now more in particular to the drawings, there will be seen in FIG. 1 a vehicle axle 1 suspended by a spring 2 which is connected in a known manner to the frame 3 of the vehicle. Connected to the vehicle axle 1 by means of an articulated linkage 4 is a retainer 5 serving as an abutment for a control spring 6. The opposite end of the control spring 6 bears upon another retainer 7 which connected to a control valve 9 by another articulated linkage 8. It is immaterial whether the control spring 6 is supported by linkage 4 or directly by axle 1 or by spring 2. Again, it is immaterial whether the control spring 6 is enclosed in a housing 10 as shown in FIGS. 1 and 2 or whether it is not provided with an enclosure.

As will be seen from FIG. 2, the control valve 9 includes a cylinder 11 enclosing two pressure chambers 13 and 14 interconnected by a port 12, a control piston 15 sealing the outer end of pressure chamber 14, and a tapered-head poppet valve 16 serving to close the port 12. The stem 17 of poppet valve member 16 is guided for axial movement in the control piston 15 and carries an enlargement 18 at its lower end. Provided between the enlargement 18 and a shoulder 19 of the control piston 15 is a compression spring 20 tending to pull the stem 17 of the poppet valve member 16 into the bore of the control piston 15. The upper end of pressure chamber 13 is closed by a screw plug 21, the lower end of the control piston 15 being closed by a screw plug 22. Screw plug 22 is connected to the aforementioned linkage 8. A pressure line 23 connects the pressure chamber 13 to the master brake cylinder 24 (FIG. 1), a pressure line 25 connecting the pressure chamber 14 to the wheel brake cylinder not shown in the drawings.

Any pressure developed in the master brake cylinder 24 will be transmitted to the pressure chamber 13 and, via port 12, to the pressure chamber 14. This pressure will thus act upon the pistons of the wheel brake cylinders as well as on the upper end of control piston 15. As soon as the force applied to control piston 15 by the fluid pressure exceeds the opposing force of control spring 6, the control piston will be displaced in a downward direction and will exert a downward pull on poppet valve 16, thus causing port 12 to be closed. Thus, any additional increase in the pressure developed in the master brake cylinder will no longer be transmitted to the wheel brake cylinders. The continued downward displacement of control piston 15 caused by the reduction in axle load produces a reduction in pressure in the wheel brake cylinders. Upon the axle load being increased again, the pressure in the wheel brake cylinders will again be increased until screw plug 22 engages stem 17 of poppet valve 16, causing valve 16 to be lifted from its seat so as again to uncover port 12. Thereafter, any increase in the pressure developed in the master brake cylinder will be freely transmitted to the wheel brake cylinders.

Any undesirable closing of port 12 by poppet valve 16 as might be caused, for example, by failure of control spring 6 or one of the linkages 4 and 8, will be prevented by the safety device shown in FIG. 3. The pressure chambers are interconnected by a bypass line 26 including a spring-loaded relief valve 27. The load acting on the relief valve is chosen in such a manner that the valve will close the bypass line between the pressure chambers 13 and 14 whenever there prevails in chamber 14 the fluid pressure required to brake the empty vehicle.

FIG. 4 shows another embodiment of the safety device in which a tapered-head valve member 29 transmits the force of control spring 6 to a valve body 30 which is rigidly connected to control piston 15. The valve member 29, upon being loaded by control spring 6, will disconnect chamber 31 from chamber 32. Chamber 31 communicates with pressure chamber 13, whereas chamber 32 communicates with pressure chamber 14. Upon the load acting on valve member 29 being removed, due, for example, to failure of control spring 6, valve member 16 will be seated, but the fluid pressure prevailing in pressure chamber 13 will lift valve member 29 from its seat as soon as this pressure reaches a predetermined value. As a result, the wheel brake cylinders are again connected to the master brake cylinder 24.

What is claimed is:

1. A control device for hydraulic brakes of vehicles for controlling the braking force applied to the wheels of an axle of said vehicles as a function of the axle load, comprising a master brake cylinder, at least one wheel brake cylinder, a fluid line connecting said cylinders, a shut-off valve in said fluid line, a control piston actuating said shut-off valve, one end of said piston being loaded by the pressure prevailing in the wheel brake cylinder and an elastic member disposed between said piston and said axle to load the other end of said piston, to close the shut-off valve and to avoid further increase of the braking force applied to the wheels while the axle load is reduced, further comprising a pressure line connecting said master brake cylinder with said wheel brake cylinder and bypassing said shut-off valve, and a closure member in said pressure line, said closure member being held in closed position by said elastic member.

2. A control device according to claim 1, wherein the control piston, the elastic member and the axle, respectively, are pivotally linked to each other.

References Cited in the file of this patent
UNITED STATES PATENTS 2,150,576    Bell _____ Mar. 14, 1939

FOREIGN PATENTS 948,551    France _____ Aug. 4, 1949
1,059,496    Germany _____ June 18, 1959